(12) United States Patent
Taguchi

(10) Patent No.: US 9,064,218 B2
(45) Date of Patent: Jun. 23, 2015

(54) INFORMATION PROCESSOR, INFORMATION PROCESSING METHOD AND COMPUTER READABLE MEDIUM

(75) Inventor: Ryouji Taguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 993 days.

(21) Appl. No.: 12/117,792

(22) Filed: May 9, 2008

(65) Prior Publication Data

US 2009/0089367 A1   Apr. 2, 2009

(30) Foreign Application Priority Data

Sep. 27, 2007   (JP) .................................. 2007-251216

(51) Int. Cl.
| | | |
|---|---|---|
| G06F 15/16 | (2006.01) | |
| G06F 17/00 | (2006.01) | |
| G06Q 10/00 | (2012.01) | |
| G06Q 10/06 | (2012.01) | |
| G06Q 10/10 | (2012.01) | |
| H04L 29/08 | (2006.01) | |

(52) U.S. Cl.
CPC ............ *G06Q 10/06* (2013.01); *G06Q 10/0633* (2013.01); *G06Q 10/103* (2013.01); *G06Q 10/06311* (2013.01); *G06Q 10/06316* (2013.01); *H04L 67/22* (2013.01)

(58) Field of Classification Search
CPC ............ G06Q 10/06; G06Q 10/06311; G06Q 10/06316; G06Q 10/0633; G06Q 10/103; H04L 67/22

USPC ........................... 709/203; 715/764; 705/7.13
See application file for complete search history.

(56) References Cited

U.S. PATENT DOCUMENTS

| | | | | |
|---|---|---|---|---|
| 5,710,921 A | * | 1/1998 | Hirose ......................... | 718/106 |
| 5,828,375 A | * | 10/1998 | Nomura et al. ............... | 715/764 |
| 2002/0196284 A1 | * | 12/2002 | Berquist et al. ............... | 345/769 |
| 2007/0047013 A1 | | 3/2007 | Kawabuchi et al. | |

FOREIGN PATENT DOCUMENTS

| | | | | |
|---|---|---|---|---|
| JP | 08-036538 A | | 2/1996 | |
| JP | 09-198326 A | | 7/1997 | |
| JP | 2004-054414 | * | 2/2004 | .............. G06F 17/60 |
| JP | 2004-054414 A | | 2/2004 | |

(Continued)

OTHER PUBLICATIONS

Marzakis, M.; Nikolaou, C., "Towards adaptive scheduling of tasks in transactional workflows," Simulation Conference Proceedings, 1995. Winter , vol., no., pp. 604,611, Dec. 3-6, 1995.*

(Continued)

*Primary Examiner* — Taylor Elfervig
(74) *Attorney, Agent, or Firm* — Sughrue Mion, PLLC

(57) ABSTRACT

An information processor includes: an information adding unit that adds to an electronic document as an object to be processed by a work in a work flow showing the flow of the work relative to a plurality of works additional information designating a connection to the electronic document to an address; and a first output unit that outputs the additional information by coordinating with the electronic document in a case where the electronic document is accessed by the operation of an operator corresponding to the address of the additional information added by the information adding unit.

10 Claims, 12 Drawing Sheets

(56) References Cited

FOREIGN PATENT DOCUMENTS

| JP | 2006-92073 A | 4/2006 |
|----|--------------|--------|
| JP | 2007-058622 A | 3/2007 |

OTHER PUBLICATIONS

Weizhuo Lu; Yaowu Wang; Bing Yao, "Decision Support System for Work Flow Management," Convergence Information Technology, 2007. International Conference on , vol., No., pp. 990,996, Nov. 21-23, 2007.*

Shujuan Li; Yan Li; Yong Liu, "Effects of Process planning Upon Production Scheduling under concurrent Environment," Intelligent Control and Automation, 2006. WCICA 2006. The Sixth World Congress on , vol. 2, No., pp. 7282,7286, 0-0 0.*

Japanese Office Action dated Oct. 20, 2009 in Japanese Appln. No. 2007-251216.

* cited by examiner

| MESSAGE FRAME IDENTIFIER | OBJECT FIELD |
|---|---|
| S1 | SIGNATURE OF PERSON SHOWING ADMISSION |
| S2 | REASON OF APPLICATION |

FIG. 9

| MESSAGE FRAME IDENTIFIER 901 | MESSAGE IDENTIFIER 902 | REPLY OBJECT MESSAGE IDENTIFIER 903 | TRANSMISSION SOURCE WORK 904 | TRANSMITTER 905 | CLASSIFICATION 906 | CONTENTS 907 |
|---|---|---|---|---|---|---|
| S1 | M1 |  | ADMISSION OF SENIOR | TANAKA | INQUIRY | RECEIPT MAY BE SCANNED IMAGE? |
| S2 | M2 |  | ADMISSION OF SENIOR | TANAKA | INQUIRY | WHAT IS THE NAME OF DISEASE? |
| S1 | M3 | M1 | GENERAL AFFAIRS PROCESS | NAKAYAMA | REPLY | OK |
| S2 | M4 | M2 | APPLICATION | YAMADA | REPLY | A COLD |

FIG. 10

| MESSAGE IDENTIFIER 1001 | ADDRESS CLASSIFICATION 1002 | ADDRESS WORK 1003 | ADDRESS WORKER (OPERATOR) 1004 | STATE 1005 |
|---|---|---|---|---|
| M1 | PERSON WHO SUBSEQUENTLY UPDATES ELECTRONIC DOCUMENT | GENERAL AFFAIRS PROCESS | NAKAYAMA | ALREADY REPLY |
| M2 | PERSON WHO LATELY UPDATES ELECTRONIC DOCUMENT | APPLICATION | YAMADA | ALREADY REPLY |
| M3 |  | ADMISSION OF SENIOR | TANAKA | NOT READ |
| M4 |  | ADMISSION OF SENIOR | TANAKA | NOT READ |

| WORK FLOW | 1101 | WORK | 1102 | PERSON IN CHARGE | 1103 |
|---|---|---|---|---|---|
| WORK FLOW OF APPLICATION FOR SPECIAL HOLIDAYS | | APPLICATION | | YAMADA | |
| WORK FLOW OF APPLICATION FOR SPECIAL HOLIDAYS | | ADMISSION OF SENIOR | | TANAKA | |
| WORK FLOW OF APPLICATION FOR SPECIAL HOLIDAYS | | GENERAL AFFAIRS PROCESS | | NAKAYAMA | |

| WORK FLOW | 1201 | TRANSITION SOURCE WORK | 1202 | TRANSITION END WORK | 1203 |
|---|---|---|---|---|---|
| WORK FLOW OF APPLICATION FOR SPECIAL HOLIDAYS | | START | | APPLICATION | |
| WORK FLOW OF APPLICATION FOR SPECIAL HOLIDAYS | | APPLICATION | | ADMISSION OF SENIOR | |
| WORK FLOW OF APPLICATION FOR SPECIAL HOLIDAYS | | ADMISSION OF SENIOR | | GENERAL AFFAIRS PROCESS | |
| WORK FLOW OF APPLICATION FOR SPECIAL HOLIDAYS | | GENERAL AFFAIRS PROCESS | | END | |

| WORK FLOW | 1301 | FIELD | 1302 | TYPE | 1303 | ARRANGEMENT | 1304 |
|---|---|---|---|---|---|---|---|
| WORK FLOW OF APPLICATION FOR SPECIAL HOLIDAYS | | SIGNATURE OF PERSONAL SECTION | | STAMP | | ..... | |
| WORK FLOW OF APPLICATION FOR SPECIAL HOLIDAYS | | REASON OF APPLICATION | | CHARACTER STRING | | ..... | |

FIG. 14

| WORK FLOW | WORK | FIELD | RIGHT |
|---|---|---|---|
| WORK FLOW OF APPLICATION FOR SPECIAL HOLIDAYS | APPLICATION | SIGNATURE OF PERSONAL SECTION | REFER |
| WORK FLOW OF APPLICATION FOR SPECIAL HOLIDAYS | APPLICATION | REASON OF APPLICATION | WRITE |
| WORK FLOW OF APPLICATION FOR SPECIAL HOLIDAYS | ADMISSION OF SENIOR | SIGNATURE OF PERSONAL SECTION | REFER |
| WORK FLOW OF APPLICATION FOR SPECIAL HOLIDAYS | ADMISSION OF SENIOR | REASON OF APPLICATION | REFER |
| WORK FLOW OF APPLICATION FOR SPECIAL HOLIDAYS | GENERAL AFFAIRS PROCESS | SIGNATURE OF PERSONAL SECTION | WRITE |
| WORK FLOW OF APPLICATION FOR SPECIAL HOLIDAYS | GENERAL AFFAIRS PROCESS | REASON OF APPLICATION | REFER |

FIG. 15

| WORK FLOW | WORK | PERSON IN CHARGE | STATE |
|---|---|---|---|
| WORK FLOW OF APPLICATION FOR SPECIAL HOLIDAYS | APPLICATION | YAMADA | ALREADY EXECUTED |
| WORK FLOW OF APPLICATION FOR SPECIAL HOLIDAYS | ADMISSION OF SENIOR | TANAKA | DURING EXECUTION |
| WORK FLOW OF APPLICATION FOR SPECIAL HOLIDAYS | GENERAL AFFAIRS PROCESS | NAKAYAMA | NOT EXECUTED |

FIG. 16

| WORK FLOW | WORK | PERSON IN CHARGE | FIELD | VALUE |
|---|---|---|---|---|
| WORK FLOW OF APPLICATION FOR SPECIAL HOLIDAYS | APPLICATION | YAMADA | REASON OF APPLICATION | MEDICAL TREATMENT OF DISEASE |

US 9,064,218 B2

INFORMATION PROCESSOR, INFORMATION PROCESSING METHOD AND COMPUTER READABLE MEDIUM

CROSS-REFERENCE TO RELATED APPLICATIONS

This application is based on and claims priority under 35 U.S.C. 119 from Japanese Patent Application No. 2007-251216 filed Sep. 27, 2007.

BACKGROUND

1. Technical Field

The present invention relates to an information processor, an information processing method and a computer readable medium.

2. Related Art

In a work flow, a place of communication is formed that includes a person in charge of a next activity as a participant, and a negotiation can be achieved in the place of communication.

SUMMARY

According to an aspect of the present invention, an information processor includes: an information adding unit that adds to an electronic document as an object to be processed by a work in a work flow showing the flow of the work relative to a plurality of works additional information designating a connection to the electronic document to an address; and a first output unit that outputs the additional information by coordinating with the electronics document in a case where the electronic document is accessed by the operation of an operator corresponding to the address of the additional information added by the information adding unit.

BRIEF DESCRIPTION OF THE DRAWINGS

Exemplary embodiment of the present invention will be described in detail based on the following figures, wherein:

FIG. 9 is an explanatory view showing a data structural example of a message table;

FIG. 10 is an explanatory view showing a data structural example of an address table;

FIG. 11 is an explanatory view showing a data structural example of a work table;

FIG. 12 is an explanatory view showing a data structural example of a message frame table;

FIG. 13 is an explanatory view showing a data structural example of a field definition table;

FIG. 14 is an explanatory view showing a data structural example of an electronic document forming table;

FIG. 15 is an explanatory view showing a data structural example of a work execution history table;

FIG. 16 is an explanatory view showing a data structural example of a field history table.

DETAILED DESCRIPTION

Figure 1:
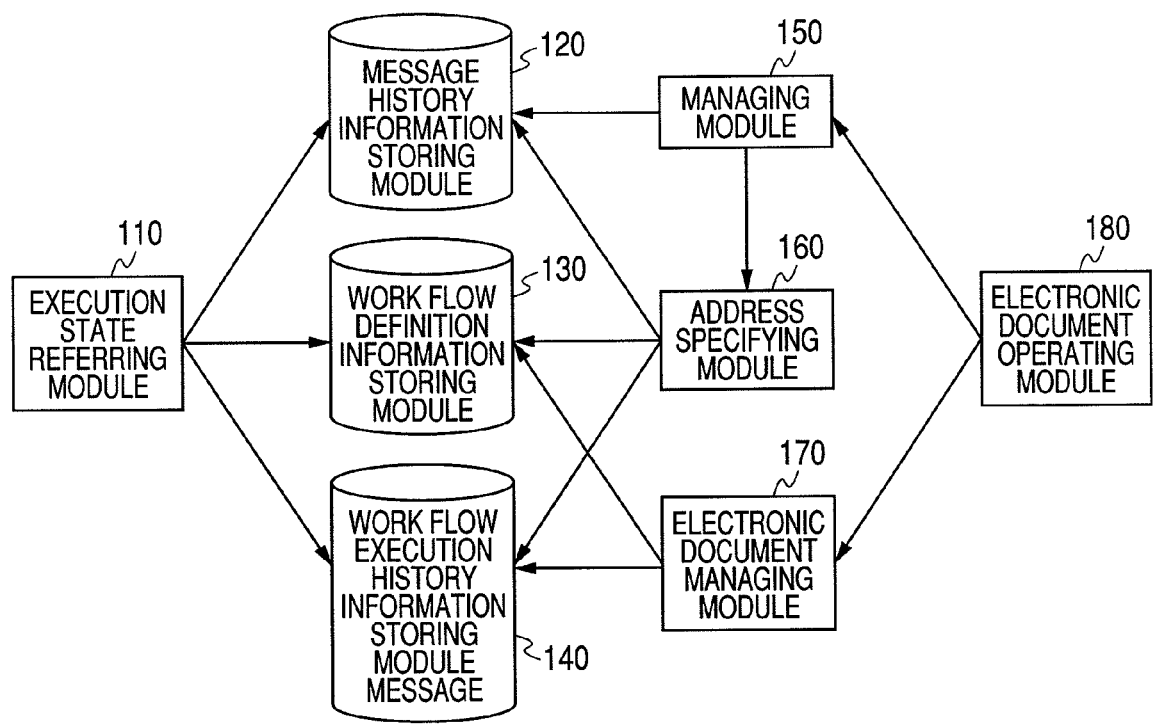
FIG. 1 is a conceptual module block diagram of a structural example of an embodiment.

Now, a preferred embodiment for realizing the present invention will be described below by referring to the drawings.

FIG. 1 is a conceptual module block diagram of a structural example of this embodiment.

A module designates ordinarily logically separable software (computer program), parts of a hardware, etc. Accordingly, the module in this embodiment designates not only the module in the computer program, but also the module in a hardware structure. Therefore, this embodiment also explains the computer program, a system and a method. In this case, for the convenience of an explanation, "store", "allow to store", "register", "allow to register" and words equivalent thereto are employed. When the embodiment is directed to the computer program, these words have a meaning of allowing a storage device to store, or of controlling the storage device to store. Further, the module corresponds to a function substantially on a one to one basis. However, in an installation, one module may be composed of one program, or a plurality of modules may be formed with one program. On the contrary, one module may be composed of a plurality of programs. Further, the plurality of modules may be executed by one computer, or one module may be executed by a plurality of computers in a distributed or parallel environment. Other modules may be included in one module. Further, a "connection" includes a logical connection (a transmission or reception of data, an instruction, a reference relation between data, etc.) as well as a physical connection hereinafter.

Further, a system or a device is constructed not only by connecting together a plurality of computers, hardware and devices by a communication unit such as a network (including a communication connection on a one to one basis), but also by realizing by one computer, hardware and device. The "device" and the "system" are used as terms having the same meaning.

A work flow is a general term of information related to tasks or the system of a flow of works, and especially in this embodiment, indicates the flow of works relative to a plurality of works. To establish or use the work flow, a work flow application (software) and a work flow system are used. Further, a group ware, a data base, a progress managing program and a schedule managing program are combined together to be used or incorporated to be used.

An access means to read or write data in the storage device (including a memory, and not necessarily provided in the computer)

An electronic document includes text information, image information, moving image information, audio information or electronic information different kinds of information (for instance, electronic information including the text information and the image information). Specifically, as the electronic document as an object to be processed by a work in the work flow, a slip is exemplified.

A connection to the electronic document means how an operator is related to the electronic document in the work flow and a position. A classification thereof includes any one or a combination of (1) the operator who lately updates the electronic document, (2) the operator who subsequently updates the electronic document and (3) the operator who updates a work designated in the electronic document.

Additional information designates data transmitted and received in accordance with a communication between the operators in the work flow hereinafter. As the additional information, a message is mainly exemplified and explained below.

Information forming the above-described work flow, the electronic document, the information related to the electronic document, information (including an address or the like) for specifying the operator from the information related to the electronic document and the additional information are stored in the storage device and serve as objects to be processed by an information processor shown in this embodiment.

As examples of the operators in the work flow, terms such as a person in charge of a work or a user are employed in, a context. This embodiment relates to a provision that carries out a communication such as an inquiry between the persons in charge of arbitrary works (activities) in the work flow and a provision that makes it possible to grasp a state or a history of the communication made between the persons in charge of the arbitrary works in the work flow.

As shown in FIG. 1, this embodiment includes an execution state referring module 110, a message history information storing module 120, a work flow definition information storing module 130, a work flow execution history information storing module 140, a message managing module 150, an address specifying module 160, an electronic document managing module 170 and an electronic document operating module 180.

The execution state referring module 110 accesses the message history information storing module 120, the work flow definition information storing module 130 and the work flow execution history information storing module 140 to output to an output device such as a display of the information processor the progressing state (described in detail below by referring to FIG. 7) of the work flow including the transmitting state and the replying state of the message between the works on the work flow, to allow the storage device to store process request information (including a response to the message by the operator corresponding to the address of the work and the message in the work flow) showing an item that requires a process by the operator in the work flow for each operator, further to register in the storage device the message as the item that requires the process by the operator corresponding to the address of the message and to output a list of the process request information (specifically, a ToDo list) to the output device such as the display of the information processor.

The message history information storing module 120 is accessed from the execution state referring module 110, the message managing module 150 and the address specifying module 160 to store information related to the history information of the messages, as described below in detail by referring to FIGS. 8 to 10.

The work flow definition information storing module 130 is accessed from the execution state referring module 110, the address specifying module 160 and the electronic document managing module 170 to store information related to the definition of the work flow, as described below in detail by referring to FIGS. 11 to 14.

The work flow execution history information storing module 140 is accessed from the execution state referring module 110, the address specifying module 160 and the electronic document managing module 170 to store information related to the execution history of the work flow, as described below in detail by referring to FIGS. 15 and 16.

The message managing module 150 accesses the message history information storing module 120 and is connected to the address specifying module 160 and the electronic document operating module 180. The message managing module 150 refers to information in the message history information storing module 120 in accordance with an instruction from the electronic document operating module 180 to transmit information related to the message (including a position of a message frame in the electronic document and the contents and the address of the message) to the electronic document operating module 180. Further, the message managing module 150 allows the message history information storing module 120 to store the information related to the message. Further, the message managing module 150 specifies the address by using the address specifying module 160.

The address specifying module 160 accesses the message history information storing module 120, the work flow definition information storing module 130 and the work flow execution history information storing module 140 and is connected to the message managing module 150. The address specifying module refers to information in the message history information storing module 120, the work flow definition information storing module 130 and the work flow execution history information storing module 140 in accordance with an instruction from the message managing module 150 to specify the address and transmits the address to the message managing module 150.

The electronic document managing module 170 accesses the work flow definition information storing module 130 and the work flow execution history information storing module 140 and is connected to the electronic document operating module 180. The electronic document managing module 170 refers to information in the work flow definition information storing module 130 and the work flow execution history information storing module 140 in accordance with an instruction from the electronic document operating module 180 to transmit information related to the electronic document (including the name of the electronic document, a structure in the electronic document, the definition of a field (an input column) in the electronic document, a history, etc.) to the electronic document operating module 180. Further, in accordance with the instruction from the electronic document operating module 180, the electronic document managing module 170 allows the work flow definition information storing module 130 and the work flow execution history information storing module 140 to store the information related to the electronic document.

The electronic document operating module 180 is connected to the message managing module 150 and the electronic document managing module 170 and carries out below-described things by using the message managing module 150 and the electronic document managing module 170. The electronic document operating module 180 adds the message whose connection to the electronic document is set to the address to the electronic document as an object to be processed by the work in the work flow. Then, when the electronic document is accessed by the operation of the operator corresponding to the address of the added message, the electronic document operating module 180 outputs the message by coordinating with the electronic document. Further, in accordance with the operation of the operator corresponding to the address of the added message, the electronic document operating module 180 may return a reply to which a second message (for instance, a reply message) to the message is added to a transmitter of the message. Further, the electronic document operating module 180 may control the transmitter of the message to inhibit from advancing to a next work from a progressing work until the reply is sent. That is, when the reply is not made, the transmitter of the message is controlled to be inhibited from carrying out the next work in the work flow. Further, the electronic document operating module 180 shows the electronic document or the message on an output device such as a display of the information processor in accordance with the information related to the electronic document received from the electronic document managing module 170.

Now, as the work flow, a work flow of an application for special holidays will be mainly exemplified and described below. As the electronic document as the object to be processed by the work in the work flow, a written application for special holidays is mainly exemplified and described.

By referring to FIG. 2, one example of the work flow of the application for special holidays will be explained.

The work flow 200 of the application for special holidays includes, as the works, an application 210, an admission of a senior 220 and a process of a personal section 230. The order thereof is determined, as shown by arks 211 and 221, to be in order of the application 210, the admission of the senior 220 and the process of the personal section 230. Further, a person in charge of the application 219 is an applicant 212 (Yamada), a person in charge of the admission of the senior 220 is a senior 222(Tanaka) and a person in charge of the process of the personal section 230 is a person 232 in charge of a persona section (Nakayama).

Namely, the applicant 212 prepares the written application for special holidays to carry out the process of the application 210. Then, the senior 222 carries out the process of the admission of the senior 220 to the application for special holidays, and finally, the person 232 in charge of the personal section carries out the process of the personal section 230.

In carrying out such a work flow, the person in charge of a certain work may occasionally desire to inquire about the contents of the circulated electronic document. Further, a person in charge of a certain work may sometimes desire to report the additional information to a person in charge of a post-process about the contents of the electronic document that has been already supplied to the post-process (the person in charge finishes his or her work).

By referring to FIG. 3, a case that the senior 222 as the person in charge of the admission of the senior 220 operates and examples of the written application for special holidays 300 and a Tanaka ToDo list 350 will be described. The written application for special holidays 300 and the Tanake ToDo list 350 are presented on the output device such as the display.

Initially, the senior 222 opens the written application for special holidays 300 as the slip of the work of which the senior has to take charge from the Tanaka ToDo list 350.

To the Tanaka ToDo list 350, the execution state referring module 110 presents a ToDo list 351 including an item name column 352, a kind of work column 353, an operating state column 354 and a message state column 355. In the item name column 352, an item name "the application for special holidays" showing the work that needs to be carried out in the work flow is presented. In the kind of work column 353, "the admission of the senior" showing the kind of the work is presented. In the operating state column 354, "during execution" showing the state of the work is presented. In the message state column 355, since the message is not described yet, a blank is presented. The message state column 355 includes four kinds of (1) not read, (2) already read, (3) already reply and (4) inquired (not reply).

To the written application for special holidays 300; the electronic document operating module 180 presents respectively columns of an applicant signature, a senior signature, a signature of a personal section, an application date, an applicant, a reason of application, an application period and a receipt. These columns are defined as the fields of the electronic document.

Then, in accordance with the operation of the senior 222, the electronic document operating module 180 additionally presents a message 310 in the reason of application column and a message 320 in the signature of the personal section column. That is, specifically, when a button of a mouse is clicked on the input column to present a pop up menu and a "message addition" operation in the menu is selected, a message frame such as a spout coordinated with the input column instructed by the mouse is formed so that the contents of the message can be written. Further, not an order that after the input column is selected, the message is added, but an order of the generation of the message frame, the selection of the input column and the addition of the message may be employed so that a template of the message frame is dragged by the mouse and arranged on the input column desired to be coordinated therewith. Further, the message frame may be coordinated with the input column by an operation for connecting the message frame arranged at an arbitrary position to the input column desired to be coordinated therewith. The message frame may be presented or hidden as required, or a mark showing that the message exists may be presented and the mark may be selected to present the message frame.

An object to which the message is added may be an arbitrary input column or an arbitrary value therein. For instance, when plural values are inputted by different operators, the message can be transmitted only to the operator who inputs a specific value. Further, the electronic document as an object to which the message is added may be an attached document (an electronic document) of the object electronic document as well as the electronic document as an object of the work flow.

The message 310 designates an inquiry to the person who lately changes the reason of application (namely, Yamada as the applicant 212). The message 320 designates an inquiry to the person in charge of the work of subsequently inputting the admission signature of the personal section (namely, Nakayama as the person 232 in charge of the personal section).

In the message, a column is prepared that designates the address of the message. To the address, a person related to the work flow who can refer to data having relation to the message can be designated. Since it is difficult to search about whom the inquiry is to be made, this method serves to mitigate the difficulty. For instance, when the button of the mouse is clicked in the column of the address, four selection items as described below are presented and any item can be selected and designated among them.

(1) Operator who lately updates the electronic document: a person who lately updates (input) this electronic document
(2) Operator who subsequently updates the electronic document: a person who subsequently updates (input) this electronic document
(3) Operator who refers to the electronic document: person who can refer to this electronic document
(4) Operator who updates a work designated in the electronic document: a person who can update a work designated in this electronic document Here, "this electronic document" may be the electronic document itself, the input column in the electronic document or the value in the input column. An access right is set to the electronic document. When the input column in the electronic document is designated as an object to which the message is added, the access right is set for each input column. When the value in the input column is designated as an object to which the message is added, the access right is set for each value in the input column.

Further, there are plural persons in charge of a certain work, the message is transmitted to all the persons in charge of the work. Further, when a person in charge of a certain work is not yet determined and the person who is not determined yet as the person in charge is designated as the address of the "operator who updates a designated work", as soon as the person in charge of the work is determined, the message is transmitted to the person in charge of the work.

More specifically, the message 310 includes, a transmitter: Tanaka, an address: the operator who lately updates the electronic document (Yamada), a classification: an inquiry, and a message: what is the name of a disease? The transmitter is a present operator extracted by the electronic document operating module 180. The address does not specify that person, and the connection to the written application for special holidays is designated as the address. Yamada of the illustrated "operator who lately updates the electronic document (Yamada)" is extracted as the person in charge who is the "operator who lately updates the electronic document" by the electronic document operating module 180. However, this extracting process is not carried out and the "operator who lately updates the electronic document" may be simply presented and selected. The classification is selected in accordance with the operation of the operator. The message is described in accordance with the operation of the operator.

Further, the message 320 includes a transmitter: Tanaka, an address: the operator who subsequently updates the electronic document (Nakayama), a classification: an inquiry, and a message: a receipt may be a scanned image? The transmitter is the present operator extracted by the electronic document operating module 180. The address does not specify that person, and the connection to the written application for special holidays is designated as the address. Nakayama of the illustrated "operator who subsequently updates the electronic document (Nakayama)" is extracted as the person in charge who is the "operator who subsequently updates the electronic document" by the electronic document operating module 180. However, this extracting process is not carried out and the "operator who subsequently updates the electronic document" may be simply presented and selected. The classification is selected in accordance with the operation of the operator. The message is described in accordance with the operation of the operator.

Now, by referring to FIG. 4, examples of the written application for special holidays 300 and a Yamada Todo list 360 provided when the applicant 212 makes a reply to the message 310 shown in FIG. 3 will be described below. The written application for special holidays 300 and the Yamada ToDo list 360 are presented on the output device such as the display.

Initially, the applicant 212 opens the written application for special holidays 300 as the slip of the work of which the applicant has to take charge from the Yamada ToDo list 360.

To the Yamada ToDo list 360, the execution state referring module 110 presents a ToDo list 361 including an item name column 362, a kind of work column 363, an operating state column 364 and a message state column 365. In the item name column 362, an item name "the application for special holidays" showing the work that needs to be carried out in the work flow is presented. In the kind of work column 363, "the application" showing the kind of the work is presented. In the operating state column 364, "already executed" showing the state of the work is presented. In the message state column 365, "having an inquiry" is presented as the state of the message. That is, since there is the inquiry by the message, the execution state referring module 110 presents it as the ToDo list 361.

Figure 3:
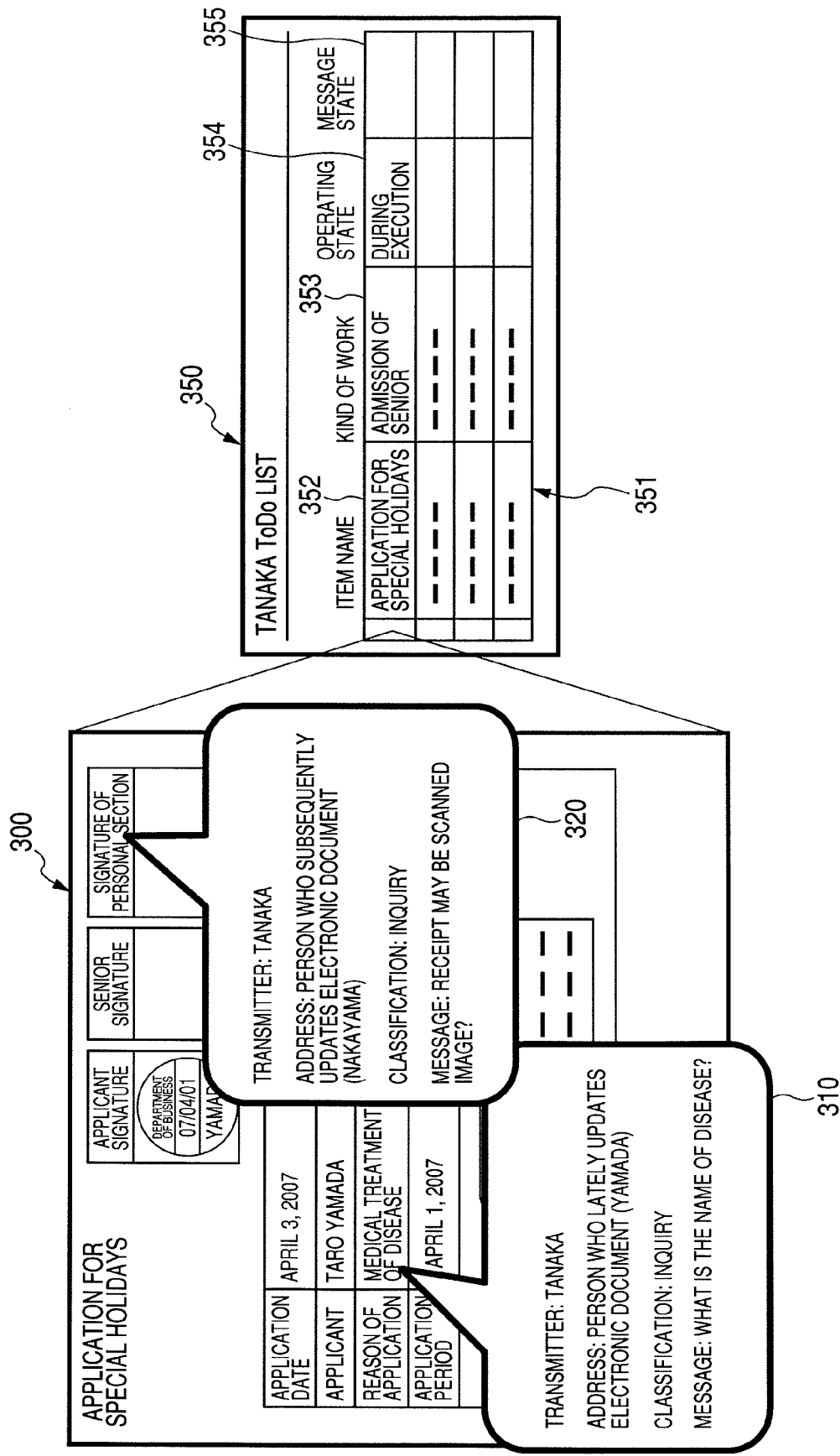
FIG. 3 is an explanatory view showing an example for presenting a message.
Figure 4:
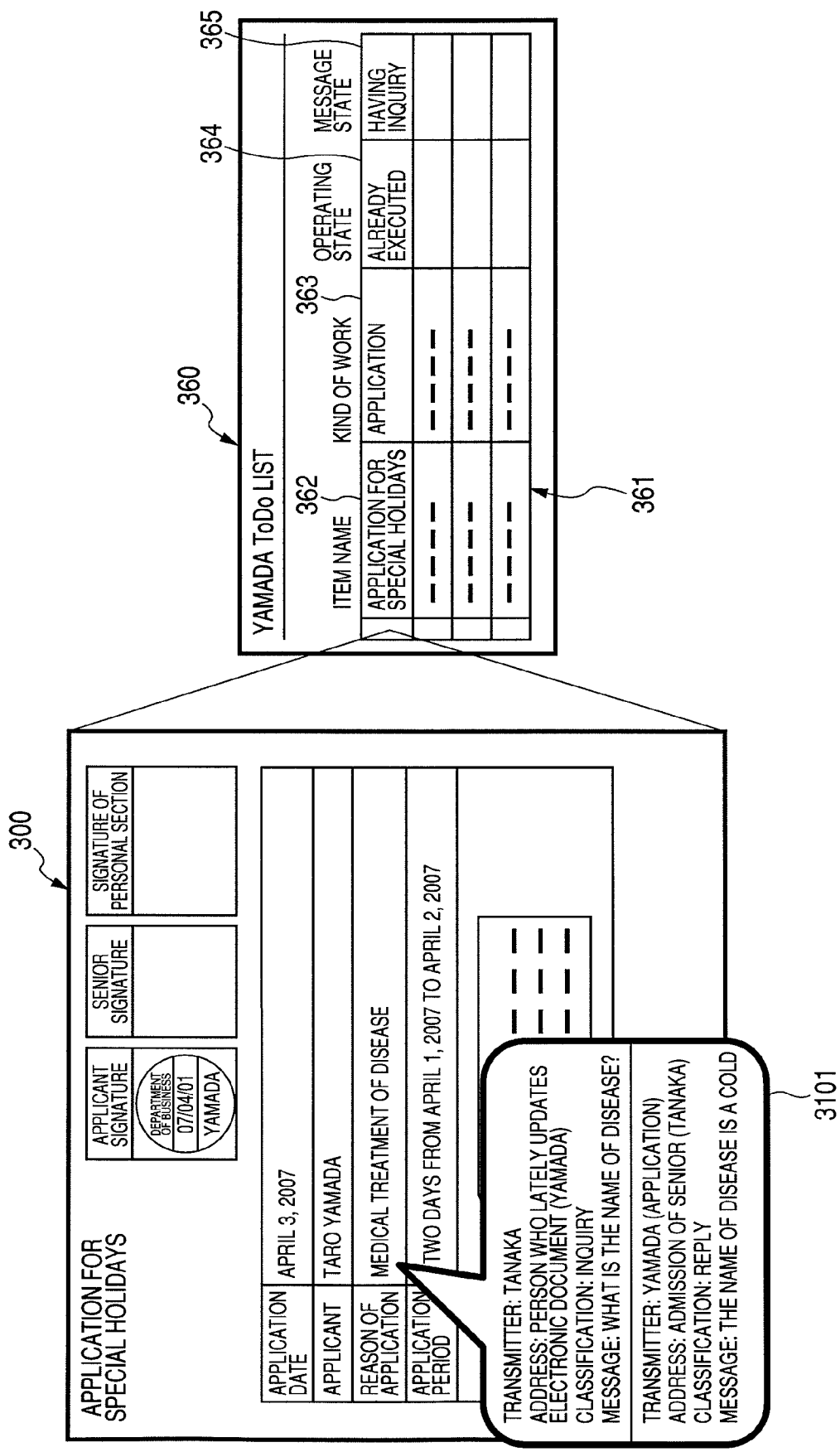
FIG. 4 is an explanatory view showing an example for presenting a message.

To the written application for special holidays 300, the electronic document operating module 180 presents a message from the senior 222 (the contents of an upper half part of the message 3101 are the same as those of the message 310 shown in FIG. 3).

Then, in accordance with the operation of the applicant 212, a lower half part of the message 3101 is inputted. That is, a reply to the message from the senior 222 is described. More specifically, the lower half part of the message 3101 includes a transmitter: Yamada (application), an address: the admission of the senior (Tanaka), a classification: a reply, and a message: the name of the disease is a cold. As the transmitter, the electronic document operating module 180 extracts a present operator like the message 310 shown in FIG. 3. The address does not specify that person, and the connection to the written application for special holidays is designated as the address. The classification is selected in accordance with the operation of the operator. The, message is described in accordance with the operation of the operator.

Figure 5:
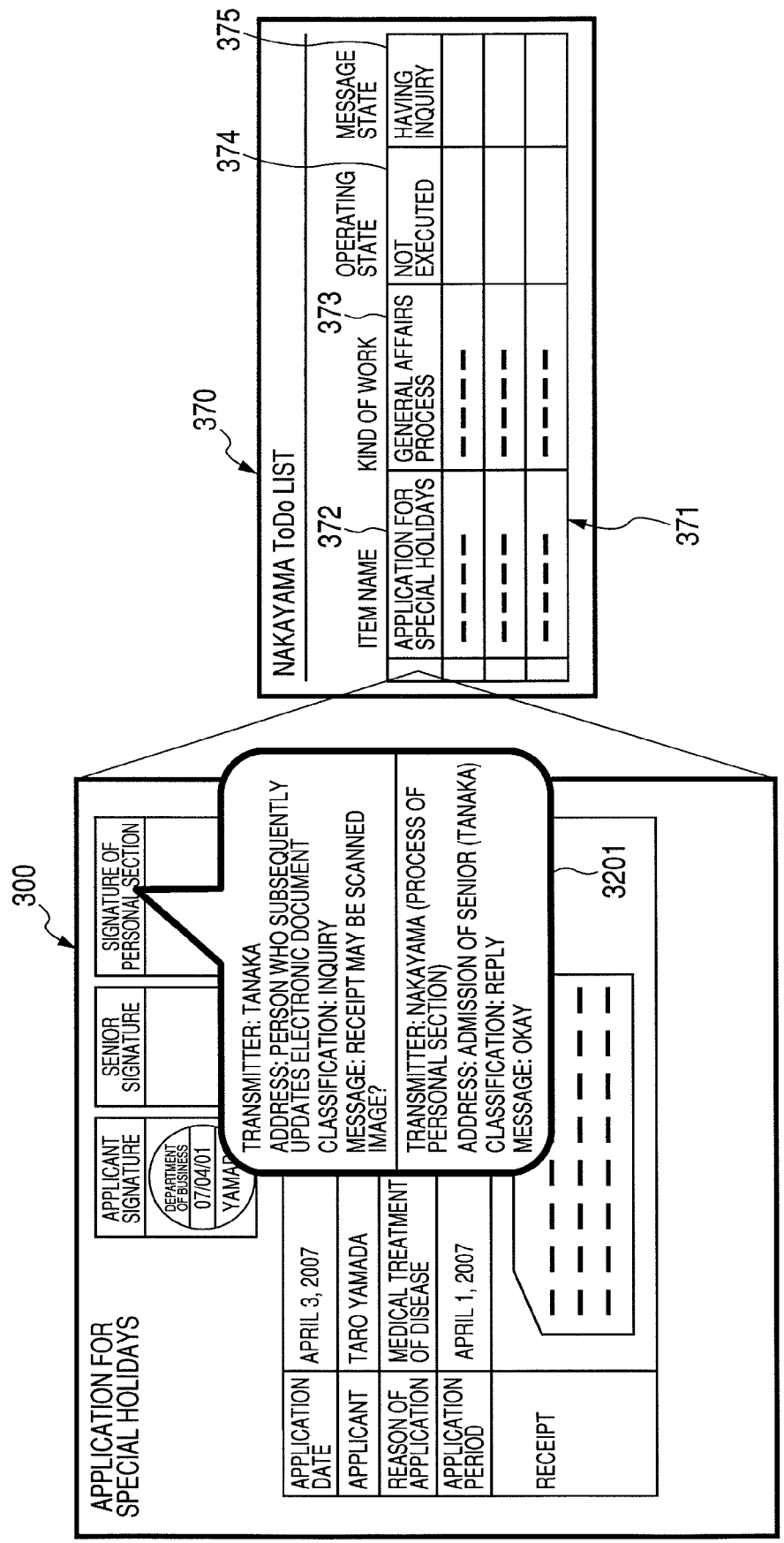
FIG. 5 is an explanatory view showing an example for presenting a message.

Now, by referring to FIG. 5, examples of the written application for special holidays 300 and a Nakayama Todo list 370 provided when the person 232 in charge of the personal section makes a reply to the message 320 shown in FIG. 3 will be described below. The written application for special holidays 300 and the Nakayama ToDo list 370 are presented on the output device such as the display.

Initially, the person 232 in charge of the personal section opens the written application for special holidays 300 as the slip of the work of which the person in charge of the personal section has to take charge from the Nakayama ToDo list 370.

To the Nakayama ToDo list 370, the execution state referring module 110 presents a ToDo list 371 including an item name column 372, a kind of work column 373, an operating state column 374 and a message state column 375. In the item name column 372, an item name "the application for special holidays" showing the work that needs to be carried out in the work flow is presented. In the kind of work column 373, "a general affairs process" showing the kind of the work is presented. In the operating state column 374, "not executed" showing the state of the work is presented. In the message state column 375, "having an inquiry" is presented as the state of the message. That is, since there is the inquiry by the message, the execution state referring module 110 presents it as the ToDo list 371.

To the written application for special holidays 300, the electronic document operating module 180 presents the message from the senior 222 (the contents of an upper half part of the message 3201 are the same as those of the message 320 shown in FIG. 3).

Then, in accordance with the operation of the person 232 in charge of the personal section, a lower half part of the message 3201 is inputted. That is, a reply to the message from the senior 222 is described. More specifically, the lower half part of the message 3201 includes a transmitter: Nakayama (the process of the personal section), an address: the admission of the senior (Tanaka), a classification: a reply, and a message: okay. The electronic document operating module 180 extracts a present operator as the transmitter like the message 320 shown in FIG. 3. The address does not specify that person, and the connection to the written application for special holidays is designated as the address. The classification is selected in accordance with the operation of the operator. The message is described in accordance with the operation of the operator.

Figure 6:
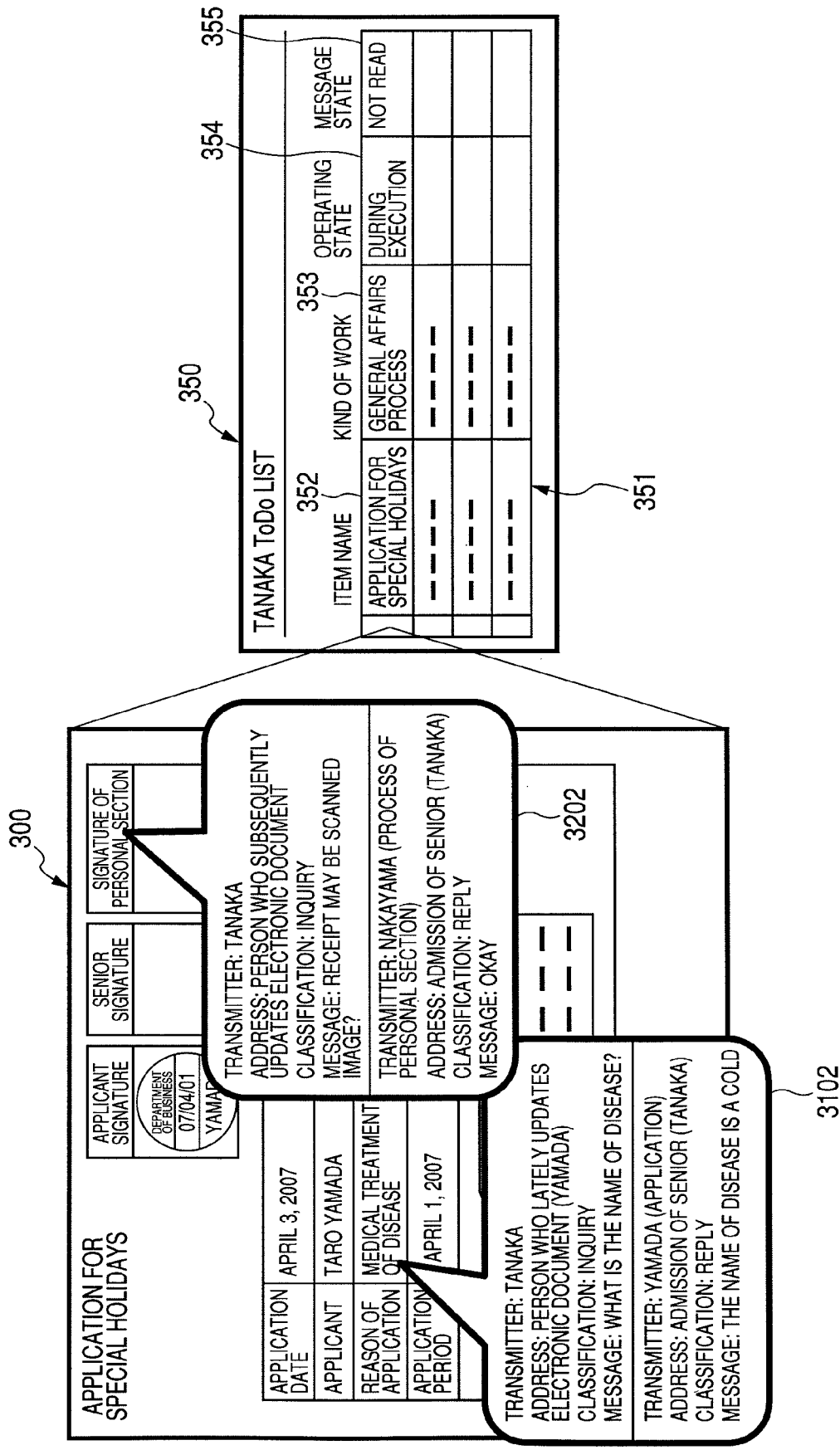
FIG. 6 is an explanatory view showing an example for presenting a message.

Now, referring to FIG. 6, examples of the written application for special holidays 300 and the Tanaka Todo list 350 provided when the senior 222 receives the replies to the message 3101 and the message 3201 shown in FIGS. 4 and 5 will be described below. The written application for special holidays 300 and the Tanaka ToDo list 350 are presented on the output device such as the display.

Initially, the senior 222 opens the written application for special holidays 300 as the slip of the work of which the senior 222 has to take charge from the Tanaka ToDo list 350.

The message state column 355 in the Todo list 351 shown in FIG. 3 changes from the blank to "messages exist that are not read", because a message 3102 and a message 320.2 are not displayed yet.

To the written application for special holidays 300, the electronic document operating module 180 presents the message 3102 including a replay message from the applicant 212 and the message 3202 including a reply message from the person 232 in charge of the personal section.

Figures 7, 8:
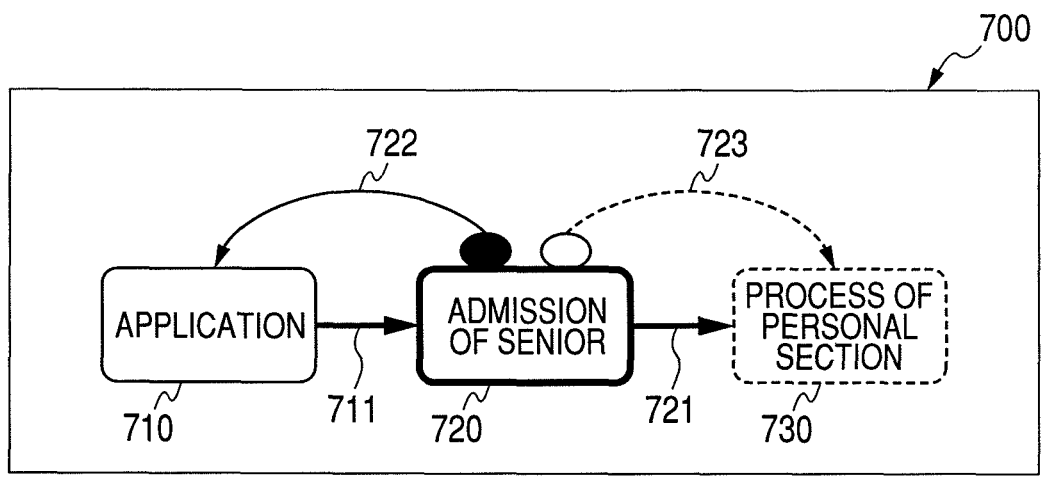
FIG. 7 is an explanatory view showing an example for presenting the execution state of the work flow.
FIG. 8 is an explanatory view showing a data structural example of a message frame table.

Referring to FIG. 7, an example of the execution state of the work flow presented by the execution state referring module 110 will be described. This represents the state shown in FIG. 4. That is, this is the state that the applicant 212 makes a reply to the inquiry message from the senior 222, however, the person 232 in charge of the personal section does not make a reply yet.

The execution state referring module 110 accesses the message history information storing module 120, the work flow definition information storing module 130 and the work flow execution history information storing module 140 to obtain a present state of the work flow and the state of the message and presents a work flow execution state 700.

An application 710, an ark 711, an admission of a senior 720, an ark 721 and a process of a personal section 730 of the work flow are presented. Progressing parts (the ark 711, the admission of the senior 720, the ark 721) are represented by thick lines. Inquiry state lines 722 and 723 are presented that show between which works the message is transmitted. Inquiry sources are represented by arrow marks of the inquiry state lines 722 and 723 (that is, an inquiry from a person in charge of the admission of the senior 720 to a person in charge of the application 710 and to a person in charge of the process of the personal section 730). A finished reply is represented by a full line (the inquiry state line (already reply) 722). An unfinished replay is represented by a dotted line (the inquiry state line (having an unfinished reply) 723).

By referring to FIGS. 8 to 10, examples of a message frame table 800, a message table 900 and an address table 1000 stored in the message history information storing module 120 will be described.

The message frame table 800 includes a message frame identifier column 801 and an object field column 802 to store which message corresponds to which field in the electronic document.

The message table 900 includes a message frame identifier column 901, a message identifier column 902, a reply object message identifier column 903, a transmission source work column 904, a transmitter column 905, a classification column 906 and a content column 907 to store the contents of the message.

The address table 1000 includes a message identifier column 1001, an address classification column 1002, an address work column 1003, an address worker column 1004 and a state column 1005 to store information related to the address. Especially, an address classification is allowed to correspond to an address worker so that the connection to the electronic document can be set to the address.

By referring to FIGS. 11 to 14, examples of a work table 1100, a transition path table 1200, a field definition table 1300 and an electronic document forming table 1400 stored in the work flow definition information storing module 130 will be described below.

The work table 1100 includes a work flow column 1101, a work column 1102 and a column of person in charge 1103 to define the work of the work flow.

Figure 2:
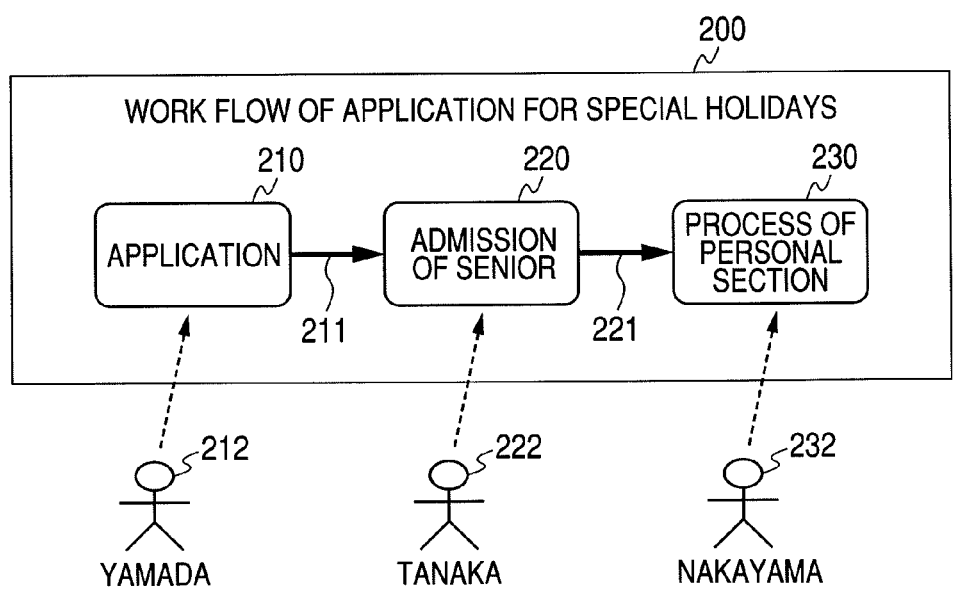
FIG. 2 is an explanatory view showing one example of a work flow of an application for special holidays.

The transition path table 1200 includes a work flow column 1202, a transition source work column 1202 and a transition end work column 1203 to define the transition path of the work flow (that is, a start point, the arks 211 and 221 shown in FIG. 2 and an end point).

The field definition table 1300 includes a work flow column 1301, a field column 1302, a type column 1303 and an arrangement column 1304 to define the field used in the electronic document.

The electronic document forming table 1400 includes a work flow column 1401, a work column 1402, a field column 1403 and a right column 1404 to define the filed that forms the electronic document and the work in the work flow by allowing them to correspond to each other, and further the right to correspond to them.

By referring to FIGS. 15 and 16, examples of a work execution history table 1500 and a field history table 1600 stored in the work flow execution history information storing module 140 will be described below.

The work execution history table 1500 includes a work flow column 1501, a work column 1502, a person in charge column 1503 and a state column 1504 to store respectively the states of the works inn the work flow.

The field history table 1600 includes a work flow column 1601, a work flow column 1602, a person in charge column 1603, a field column 1604 and a value column 1605 to store contents respectively described in the fields of the electronic document.

Now, processes (S11 to S17) for presenting the message on the electronic document will be described.

(S11) The electronic document operating module 180 requests the electronic document managing module 170 to supply filed information forming the electronic document of an object work.

(S12) The electronic document managing module 170 refers to the electronic document forming table 1400 and the field definition table 1300 in the work flow definition information storing module 130 to collect field definition information forming the electronic document of the designated work. The field definition information includes a field name, type information, a right (write or reference), arrangement information on the electronic document or the like.

(S13) The electronic document managing module 170 extracts the value of a filed corresponding to the field of the work of a request source from the field history table 1600 in the work flow execution history information storing module 140.

(S14) The electronic document operating module 180 requests the message managing module 150 to supply message information respectively coordinated with the fields on the basis of the field definition information returned from the electronic document managing module 170.

(S15) The message managing module 150 refers to the message table 900 and the address table 1000 in the message history information storing module 120 to extract the message information coordinated with the worker of the request source or the designated field whose connection (including the work) to the electronic document is the address and returns the message information to the electronic document operating module 180. The message information includes information such as the transmitter, the address, the classification of the message and the contents of the message. At this time, when the state of the message is "not read", the state is set to "already read".

(S16) The electronic document operating module 18 forms a screen of the electronic document on the basis of the field definition information returned from the electronic document managing module 170.

(S17) The electronic document operating module 180 arranges the message information returned from the message managing module 150.

Now, processes (S21 to S27) carried out when the message is transmitted will be described below.

(S21) The electronic document operating module 180 specifies the field as the object from a position where the message frame is arranged.

(S22) The electronic module 180 delivers the filed as the object and the classification of the address to the address specifying module 160 through the message managing module 150 to request for a specific address.

(S23) The address specifying module 160 carries out below-described operations depending on the type of the designated address.

(1) When the address is the "person who lately updates the electronic document", the address specifying module 160 refers to the field history table 1600 in the work flow execution history information storing module 140 to specify the person who lately updates the field of the object and the work thereof.

(2) When the address is the "person who subsequently updates the electronic document", the address specifying module 160 refers to the work table 1100, the transition path table 1200 and the electronic document forming table 1400 in the work flow definition information storing module 130 to specify the work and the person in charge that subsequently edit the field of the object.

(3) When the address is the "person who refers to the electronic document", the address specifying module refers to the work table 1100 and the electronic document forming table 1400 in the work flow definition information storing module 130 to specify the work and the person in charge that can refer to the field of the object.

(4) When the address is the "person who updates the designated work", the address specifying module refers to the work table 1100 and the electronic document forming table 1400 in the work flow definition information storing module 130 to specify the work and the person in charge that can update the field of the object.

(S24) The address specifying module 160 returns the specified address, the work and the person in charge to the electronic document operating module 180 through the message managing module 150.

(S25) The electronic document operating module 180 delivers the specified address information and the message information to the message managing module 150.

(S26) The message managing module 150 stores the address information and the message information delivered form the electronic document operating module 180 in the message history information storing module 120.

(S27) The message managing module 150 sets the states of the message as described below depending on the classification of the message.

(1) When the classification of the message is the "inquiry": the state of the message is set to "not reply".

(2) When the classification of the message is other than the above: the state of the message is set to "not read".

Figure 17:
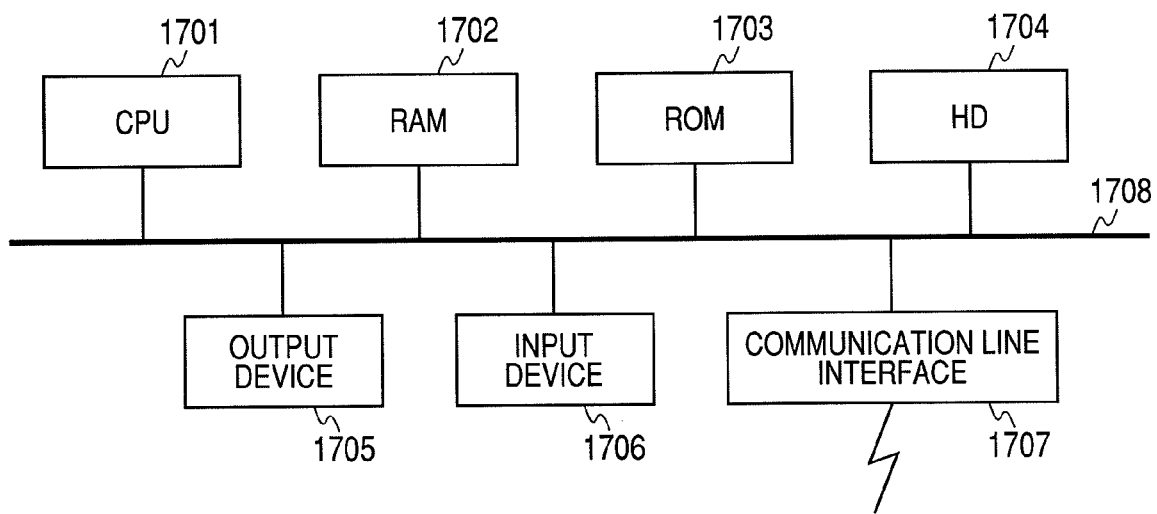
FIG. 17 is a block diagram showing a structural example of a computer for realizing an embodiment.
Figure 18:
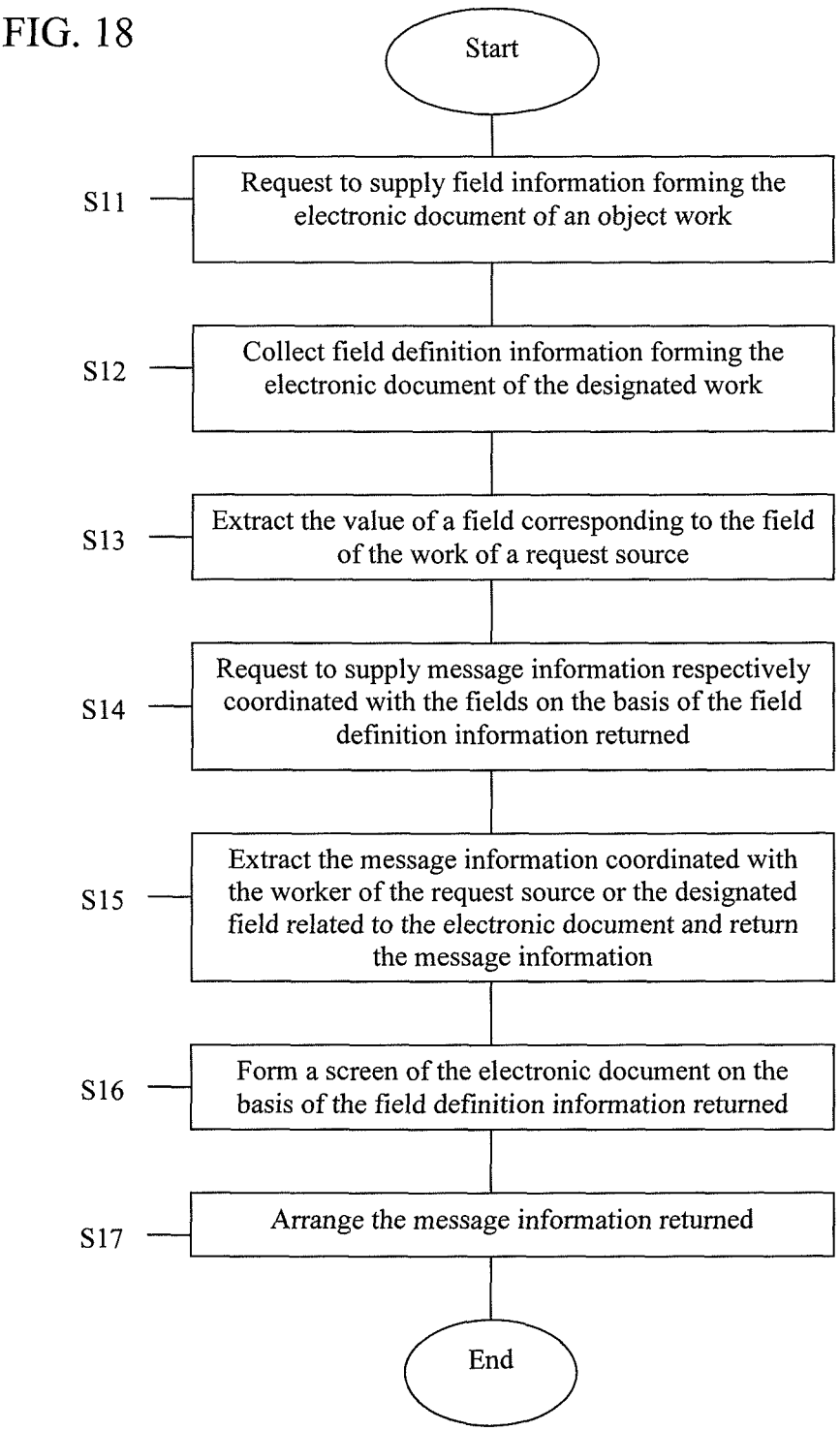
FIG. 18 is a flowchart illustrating an example of a process for presenting a message on an electronic document.
Figure 19:
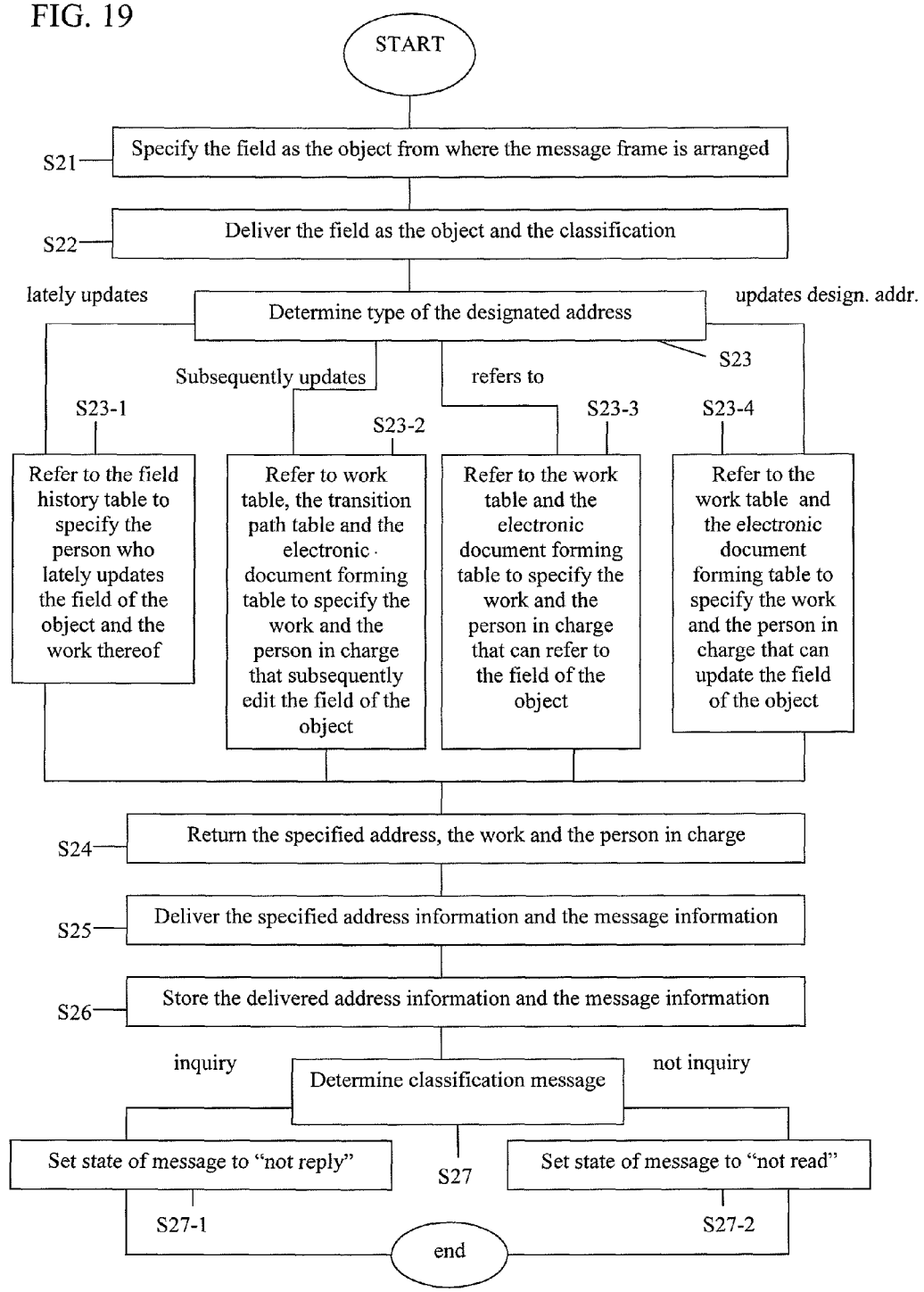
FIG. 19 is a flowchart illustrating an example of a process carried out when a message is transmitted.

A hardware structure of a computer on which a program as an embodiment is executed is an ordinary computer as shown in FIG. 17, and specifically a computer that may be a personal computer or a server. The computer includes a CPU 1701 for executing the programs of the execution state referring module 110, the electronic document operating module 180, the message managing module 150, the address specifying module 160 and the electronic document managing module 170, a RAM 1702 for storing the programs or data, a ROM 1703 for storing a program for activating this computer, an HD 1704 as an auxiliary storage device (for instance, a hard disk can be used), an input device 1706 for inputting data such as a keyboard, a mouse or the like, an output device 1705 such as a CRT or a liquid crystal display, a communication line interface 1707 for connecting to a communication network (for instance, a network interface card can be used) and a bus 1708 for connecting them together to transmit and receive data. A plurality of the computers may be connected together by the network.

In the embodiment related to the computer program of the above-described embodiments, the computer program as software is allowed to be read by a system of this hardware structure so that the software cooperates with hardware resources to realize the above-described embodiment.

The hardware structure shown in FIG. 17 shows one structural example. This embodiment is not limited to the structure shown in FIG. 17, a structure that can execute the modules explained in this embodiment may be used. For instance, a part of the modules may be formed with an exclusive hardware (for instance, ASIC, etc.). A part of the modules may be provided in an outer system and connected by a communication line. Further, a plurality of systems shown in FIG. 17 may be connected together by the communication line and mutually cooperate. Further, the system shown in FIG. 17 may be incorporated in an electric information domestic device, a copying machine, a facsimile device, a scanner, a printer, a compound machine (an image processor having two or more functions of the scanner, the printer, the copying machine, the facsimile device, or the like) as well as the personal computer.

In the above-described embodiment, the "present" may include an audio presentation as well as a display on a display device.

In the above-described embodiment, data structures shown in FIGS. 8 to 16 are not limited to these data structures, and other data structures may be employed. For instance, table structures maybe link structures. Further, data items are not limited to items shown in the drawings and other items maybe included. For instance, the message table 900 may include a reply term column for storing a reply term. In this case, when the message is not returned within the reply term, this (the term expires) may be presented to the ToDo list.

The above-described program may be stored and presented in a recording medium. Further, the program may be provided by a communication unit. In that case, for instance, the above-described program may be taken as the invention of "a recording medium readable by a computer on which a program is recorded".

"The recording medium readable by a computer on which a program is recorded" indicates a recording medium readable by a computer on which a program is recorded that is used to install and execute a program and circulate the program.

As the recording medium, are included, for instance, a digital versatile disk (DVD) such as "DVD-R, DVD-RW, DVD-RAM, etc." of a standard established in a DVD forum, "DVD+R, DVD+RW, etc," of a standard established in a DVD+RW, a compact disk (CD) such as a read only memory (CD-ROM), a CD recordable (CD-R), a CD rewritable (CD-RW), etc., a photo-electro magnetic disk (MO), a flexible disk (FD), a magnetic tape, a hard disk, a read only memory (ROM), electrically erasable and rewritable read only memory (EEPROM), a flash memory, a random access memory (RAM), etc.

Then, the above-described program or a part thereof may be recorded and stored in the recording medium or circulated. Further, the program may be transmitted by a communication, for instance, by using a transmitting medium such as a wired network or a radio communication network and a combination thereof used in a local area network (LAN), a metropolitan area network (MAN), a wide area network (WAN), an internet, an intranet, an extra-net, or carried by a carrier wave.

Further, the above-described program may be a part of other program, or may be recorded on the recording medium together with a separate program. Further, the program may be divided and recorded in a plurality of recording media. Further, the program may be recorded in any form such as a compressed form or an encoded form that can be restored.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments we-re chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing apparatus comprising:
    an information adding unit stored in memory and used in one or more central processing units (CPUs) to add additional information to an electronic document and associate the additional information to a given area on the electronic document, the electronic document being an object to be processed in a work flow, the additional information comprising an address field that includes a destination of the additional information, the destination being included in the address field as information specifying a particular connection of a destination operator to the electronic document;
    a first output unit stored in memory and used in the one or more CPUs to output the additional information in coordination with the electronic document at a time which the electronic document is accessed by the destination operator and output the additional information in coordination with the electronic document such that the additional information overlaps the given area on the electronic document;
    a replying unit stored in memory and used in the one or more CPUs to return a reply showing that second additional information is added to the additional information, the second additional information being added to a transmitter field of the additional information in accordance with an operation of the destination operator;
    an inhibition control unit stored in memory and used in the one or more CPUs to control transmission of the additional information so as to inhibit a progress of work in the work flow from advancing to a next work until the replying unit returns the reply; and
    a second output unit stored in memory and used in the one or more CPUs to output a progress state of the work flow including a transmitting state and a replying state of the additional information between works in the work flow,
    wherein the information specifying the connection of the destination operator to the electronic document is at least one of an operator who lately updates the electronic document, an operator who subsequently updates the electronic document, and an operator who updates a work designated in the electronic document, and
    wherein the additional information is a message specifically addressed to one of the operator who lately updates the electronic document, the operator who subsequently updates the electronic document, and the operator who updates a work designated in the electronic document,
    wherein the message is an inquiry or an answer, and
    wherein the additional information is added to the electronic document during a particular work stage of the work flow, and the inhibition control unit inhibits advancing from the particular stage to a next work stage of the work flow until the replying unit returns a reply from an operator of a previous work stage of the work flow.

2. The information processing apparatus as claimed in claim 1, further comprising:
    a necessary item storage that stores process request information showing, for each operator, an item of the work flow that requires processing by the operator;
    a registering unit that registers the additional information added by the information adding unit in the necessary item storage as the item that requires processing by the operator corresponding to the address field of the additional information; and
    a third output unit that outputs the process request information stored in the necessary item storage.

3. The information processing apparatus according to claim 1, wherein the message is generated in a message frame that is separate from the electronic document.

4. The information processing apparatus according to claim 1, wherein the destination of the additional information is selectable from a selectable list of information respectively specifying different connections of destination operators to the electronic document.

5. The information processing apparatus as claimed in claim 1, wherein the destination of the additional information is selectable from a selectable list of operators, the selectable list of the operators includes the operator who lately updates the electronic document, the operator who subsequently updates the electronic document, and the operator who updates the work designated in the electronic document.

6. The information processing apparatus as claimed in claim 1, wherein the replying unit returns the reply to an operator that adds the additional information to the electronic document.

7. An information processing method comprising:
    using one or more central processing units (CPUs), adding additional information to an electronic document and associating the additional information to a given area on the electronic document, the electronic document being an object to be processed by work in a work flow showing the flow of the work relative to a plurality of works, the additional information comprising an address field that includes a destination of the additional information, the destination being included in the address field as information specifying a connection of a destination operator to the electronic document;

outputting, using the one or more central processing units (CPUs), the additional information in coordination with the electronic document in a case in which the electronic document is accessed by the destination operator and in coordination with the electronic document such that the additional information overlaps the given area on the electronic document;

returning a reply showing that second additional information is added to the additional information, the second additional information being added to a transmitter field of the additional information in accordance with an operation of the destination operator; and controlling transmission of the additional information so as to inhibit a progress of the work in the work flow from advancing to a next work until the reply is returned, wherein the information specifying the connection of the destination operator to the electronic document is at least one of an operator who lately updates the electronic document, an operator who subsequently updates the electronic document, and an operator who updates a work designated in the electronic document, and wherein the additional information is a message specifically addressed to one of the operator who lately updates the electronic document, the operator who subsequently updates the electronic document, and the operator who updates a work designated in the electronic document, wherein the message is an inquiry or an answer, wherein the information processing method further comprises outputting a progress state of the work flow including a transmitting state and a replying state of the additional information between works in the work flow, and wherein the additional information is added to the electronic document during a particular work stage of the work flow, and the inhibition control unit inhibits advancing from the particular stage to a next work stage of the work flow until the replying unit returns a reply from an operator of a previous work stage of the work flow.

8. The information processing method as claimed in claim 7, wherein the destination of the additional information is selectable from a selectable list of operators, the selectable list of the operators includes the operator who lately updates the electronic document, the operator who subsequently updates the electronic document, and the operator who updates the work designated in the electronic document.

9. A non-transitory computer readable recording medium storing a program causing a computer to execute a process for performing an information processing, the process comprising:

adding additional information to an electronic document and associating the additional information to a given area on the electronic document, the electronic document being an object to be processed by work in a work flow showing the flow of the work relative to a plurality of works, the additional information comprising an address field that includes a destination of the additional information, the destination being included in the address field as information specifying a connection of a destination operator to the electronic document;

outputting the additional information in coordination with the electronic document in a case in which the electronic document is accessed by the destination operator and in coordination with the electronic document such that the additional information overlaps the given area on the electronic document;

returning a reply showing that second additional information is added to the additional information, the second additional information being added to a transmitter field of the additional information in accordance with an operation of the destination operator; and controlling transmission of the additional information so as to inhibit a progress of the work in the work flow from advancing to a next work until the reply is returned, wherein the information specifying the connection of the destination operator to the electronic document is at least one of an operator who lately updates the electronic document, an operator who subsequently updates the electronic document, and an operator who updates a work designated in the electronic document, and wherein the additional information is a message specifically addressed to one of the operator who lately updates the electronic document, the operator who subsequently updates the electronic document, and the operator who updates a work designated in the electronic document, wherein the message is an inquiry or an answer, wherein the process further comprises outputting a progress state of the work flow including a transmitting state and a replying state of the additional information between works in the work flow, and wherein the additional information is added to the electronic document during a particular work stage of the work flow, and the inhibition control unit inhibits advancing from the particular stage to a next work stage of the work flow until the replying unit returns a reply from an operator of a previous work stage of the work flow.

10. The non-transitory computer readable recording medium as claimed in claim 9, wherein the destination of the additional information is selectable from a selectable list of operators, the selectable list of the operators includes the operator who lately updates the electronic document, the operator who subsequently updates the electronic document, and the operator who updates the work designated in the electronic document.

* * * * *